US012555485B2

United States Patent
Harrison

(10) Patent No.: US 12,555,485 B2
(45) Date of Patent: Feb. 17, 2026

(54) AUTONOMOUS TAXIING METHOD AND APPARATUS

(71) Applicant: BAE SYSTEMS plc, London (GB)

(72) Inventor: James Austen Harrison, Rochester (GB)

(73) Assignee: BAE SYSTEMS PLC, London (GB)

( * ) Notice: Subject to any disclaimer, the term of this patent is extended or adjusted under 35 U.S.C. 154(b) by 253 days.

(21) Appl. No.: 18/254,643

(22) PCT Filed: Nov. 25, 2021

(86) PCT No.: PCT/GB2021/053067
§ 371 (c)(1),
(2) Date: May 26, 2023

(87) PCT Pub. No.: WO2022/112773
PCT Pub. Date: Jun. 2, 2022

(65) Prior Publication Data
US 2024/0021095 A1     Jan. 18, 2024

(30) Foreign Application Priority Data

Nov. 26, 2020 (EP) .................................. 20275175
Nov. 26, 2020 (GB) .................................. 2018579

(51) Int. Cl.
G08G 5/06  (2006.01)
G08G 5/51  (2025.01)

(52) U.S. Cl.
CPC ..................................... G08G 5/51 (2025.01)

(58) Field of Classification Search
CPC .. G08G 5/51; G08G 5/55; G08G 5/56; G08G 5/57; G08G 5/58; G08G 5/21; G08G 5/20;
(Continued)

(56) References Cited

U.S. PATENT DOCUMENTS 5,835,880 A * 11/1998 Gan ........................... G01S 5/16
                                                      382/199
9,293,055 B2 * 3/2016 Nutaro ..................... G05D 13/62
(Continued)

FOREIGN PATENT DOCUMENTS

CN     109131325 A  *  1/2019  ............ B60W 30/12
CN     109934871 A  *  6/2019
(Continued)

OTHER PUBLICATIONS

"Degree of Curvature", Feb. 22, 2019, Wikipedia (Year: 2019).*
(Continued)

*Primary Examiner* — Erin M Piateski
*Assistant Examiner* — Ashley Tiffany Schoech
(74) *Attorney, Agent, or Firm* — Arcane Law PLLC

(57) ABSTRACT

A method to autonomously taxi an aircraft is disclosed. The method comprises receiving, by a processing means, a route intended for the aircraft 310. Obtaining, by the processing means, a route line based on the route 320. Determining, by the processing means, at least one route feature along the route line 330. Determining, by the processing means, a deviation of a nosewheel of the aircraft from the route line based on a current position of the aircraft provided by the aircraft global navigation satellite system (GNSS) 340. Outputting, by the processing means, an adjustment of an angle of the nosewheel to correct the deviation from the route based on the deviation of the nosewheel 350. Outputting, by the processing means, an adjustment of the speed of the aircraft based on a current position on the route line and a proximity to the at least one determined route feature 360.

17 Claims, 4 Drawing Sheets

(58) Field of Classification Search
CPC ...... G01C 21/20; G01C 23/00; G05D 1/0083; G05D 1/0202; G05D 1/437; G05D 1/439; B64F 1/002; B64D 2205/00
See application file for complete search history.

(56) References Cited

U.S. PATENT DOCUMENTS

| | | | |
|---|---|---|---|
| 10,272,914 B2* | 4/2019 | Harda | B60W 10/18 |
| 2004/0059497 A1 | 3/2004 | Sankrithi | |
| 2007/0299598 A1* | 12/2007 | Fetzmann | G08G 5/51 |
| | | | 701/120 |
| 2008/0133074 A1* | 6/2008 | Zyss | G05D 1/0083 |
| | | | 244/175 |
| 2008/0275607 A1* | 11/2008 | Ammon | B60G 17/0163 |
| | | | 701/38 |
| 2009/0189734 A1* | 7/2009 | Klein | G07F 7/1075 |
| | | | 235/382 |
| 2010/0114922 A1 | 5/2010 | Gayraud et al. | |
| 2013/0015290 A1* | 1/2013 | Benmoussa | B64C 25/30 |
| | | | 244/50 |
| 2013/0200209 A1 | 8/2013 | Goldman et al. | |
| 2014/0278037 A1* | 9/2014 | Choksi | G08G 5/51 |
| | | | 701/120 |
| 2015/0142220 A1 | 5/2015 | Scacchi | |
| 2017/0032687 A1 | 2/2017 | Lamkin et al. | |
| 2017/0096042 A1* | 4/2017 | Unger | B60W 40/06 |
| 2017/0148333 A1 | 5/2017 | Alonso Tabares | |
| 2017/0361921 A1* | 12/2017 | Labry | G05G 5/04 |
| 2018/0265123 A1* | 9/2018 | Mardh | G05D 1/0274 |
| 2019/0049260 A1* | 2/2019 | Gaither | B60W 40/00 |
| 2019/0375405 A1 | 12/2019 | Mizoguchi | |
| 2020/0027362 A1* | 1/2020 | Dame | G05D 1/0202 |

FOREIGN PATENT DOCUMENTS

| | | | | |
|---|---|---|---|---|
| EP | 0943527 A2 * | 9/1999 | | B62D 5/046 |
| EP | 0943527 B1 | 2/2004 | | |
| EP | 2511733 A2 * | 10/2012 | | B64D 43/00 |
| EP | 3671395 A1 | 6/2020 | | |
| WO | 2022112773 A1 | 6/2022 | | |

OTHER PUBLICATIONS

"Satellite Navigation", Jun. 18, 2019, Wikipedia (Year: 2019).*
International Search Report and Written Opinion received for PCT/GB2021/053067. Mailed: Feb. 22, 2022. 14 pages.
GB Combined Search and Examination Report under Sections 17 and 18(3), for Application No. GB2117056.8, dated May 20, 2022. 7 pages.
GB Combined Search and Examination Report under Sections 17 and 18(3), for Application No. GB2018579.9, dated May 21, 2021. 7 pages.
Extended European Search Report received for EP Application No. 20275175.6, dated May 4, 2021. 9 pages.

* cited by examiner

AUTONOMOUS TAXIING METHOD AND APPARATUS

BACKGROUND

Aircraft often land at airfields that are unknown to the pilot. The pilot may receive a route from the local air traffic control (ATC) to navigate. However, at least due to the lack of knowledge of the airfields, the pilot may make a mistake.

DETAILED DESCRIPTION

Figure 1:
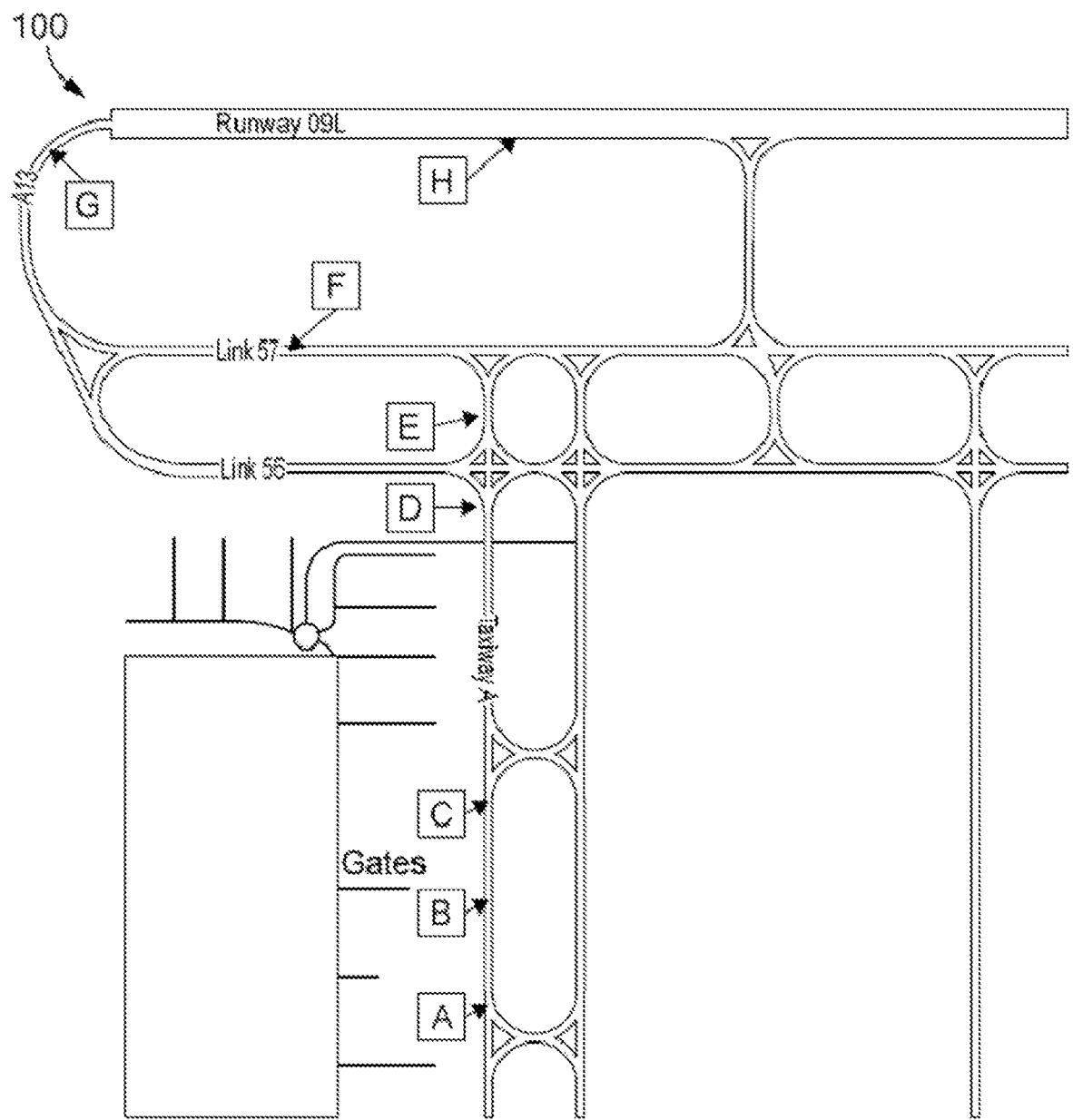
FIG. 1 illustrates an airfield.

FIG. 1 illustrates a typical airfield 100. The airfield comprises various taxiways A-G and a runway H. An aircraft might be required to navigate a route sent by the ATC. The route may comprise a route from a gate to a runway. Alternatively, the route may comprise a route from a runway to the gate. Other routes may also be desired. Navigating the taxiways may be difficult for a pilot, for example if weather conditions are poor, or if the airfield or particular route are unknown to the pilot. This may increase the probability of making mistakes and also may increase the workload of the pilot. In order to avoid such a scenario an auto-taxiing method may be used, similar to an autopilot when in the air and may be referred to as an auto-taxi or taxi autopilot.

The aircraft may comprise an arming mechanism for the auto-taxi. The arming mechanism may arm the taxi autopilot such that the autopilot can transition into an engaged mode once a number of conditions are satisfied. The conditions may comprise at least one of:
1. A route has been programmed into the taxi autopilot system.
2. The distance of the nosewheel from the programmed route is within a predefined tolerance.
3. The aircraft flight systems have latched ground mode.
4. Ground speed is below a predefined taxi speed threshold.

The arming procedure may differ based on whether the aircraft is taxiing from the gate to the runway, or from runway to the gate.

If the aircraft is taxiing from the gate to the runway, then the autopilot may be armed after the aircraft is pushed back, after all initial checklists are complete, the correct taxi route is loaded into the system and the aircraft position is within the pre-determined limit of the planned route.

For landing operations the taxi autopilot system may be armed on approach. Upon landing and following roll-out braking (auto or manual) to a safe taxi speed, the autopilot may engage once the programmed route was loaded into the system. A safe taxi speed may be nominally 35 knots.

The taxi autopilot system may transition from an engaged mode to a disengaged mode, where the pilot has control. The transition may be made with haptic, visual, and audible warnings prior to pilot control being resumed, at the moment of transition and afterwards. The taxi autopilot may transition under a number of conditions, such as:
1. Deviation from the programmed route over a pre-determined threshold.
2. Armed switched toggled from armed to off.
3. Manual input received on nosewheel steering device, e.g. to apply course adjustment.
4. Manual input received on throttle or braking system, e.g. to apply change in velocity.

The aircraft may comprise processing means configured to receive a route. The route may be sent by ATC or may be input by the crew. The route may be manually entered by the flight crew based on ATC instruction. The processing means may be configured to convert a selection of a route of taxiways into a set of Global Navigation Satellite System (GNSS) coordinates. Alternatively the route may be received from the ATC to the aircraft systems, such as via the Aircraft Communication and Reporting System (ACARS). The route may be converted into GNSS coordinates prior to being sent to the aircraft or after being sent to the aircraft.

The GNSS coordinates may comprise Global Positioning System coordinates, or any other type of GNSS.

The route may comprise a set of position coordinates, such as GNSS coordinates. The coordinates may be used to define a series of straight and corner segments.

A straight may be defined as a line between two sets of geographic coordinates which constitute the start and end point of the line.

A curve may be defined from three sets of geographic coordinates. Two of the coordinates define the start and end point of the curve. The third coordinate may define a control point such that a Bezier curve is prescribed by the three sets of coordinates such that the shape of the corner is matched or matched within a predetermined safety threshold.

The processing means may be configured to obtain a route line. The route line may comprise a center line of the route, such that the route line is the line that is in the middle of each line, and is the line that the nosewheel of the aircraft would be expected to follow. In some examples the route line may be pre-determined. In some examples the route line may be determined by the processing means.

The processing means may be configured to determine route features along the route. A route feature may comprise a straight portion, a curve, a static hazard or a dynamic hazard. The processing means may also be configured to split the route into at least one segment. In some examples the number of segments may be based on the number of route features. In some examples the number of segments may be based on the number of a subset of route features, for example the number of straight and curved sections of the route.

The processing means may be configured to determine a deviation of the nosewheel of the aircraft from the route line based on the current position of the aircraft provided by the aircraft GNSS. The position may be determined by applying an offset to the current position of the aircraft provided by the aircraft GNSS determined position, the offset based on the geometry of the particular aircraft. This geometric and offset information may be stored in a database or look up table such that it may be received at the processor. The nosewheel position may be calculated using trigonometry (e.g. for Cartesian coordinates) and/or standard spherical-surface formulae (e.g. for geographic coordinates). A determination as to whether or not the position is calculated using the standard spherical-surface formulae (e.g. so as to provide geographic coordinates) may comprise receiving data defining aircraft length (e.g. from a database) such that if the aircraft is below a threshold length, standard spherical-surface formulae are not used and standard trigonometry will suffice, but if the aircraft is above the threshold, then standard spherical-surface formulae are used to mitigate error. The threshold may be in the range 15-50 metres, or more particularly 20-30 metres, or may be 20 metres.

This technique may allow the nosewheel position to be determined without adding extra cameras or LiDAR to an aircraft. This has an advantage of requiring less formal certification and testing. The GNSS may comprise a dual band system.

Figure 2A:
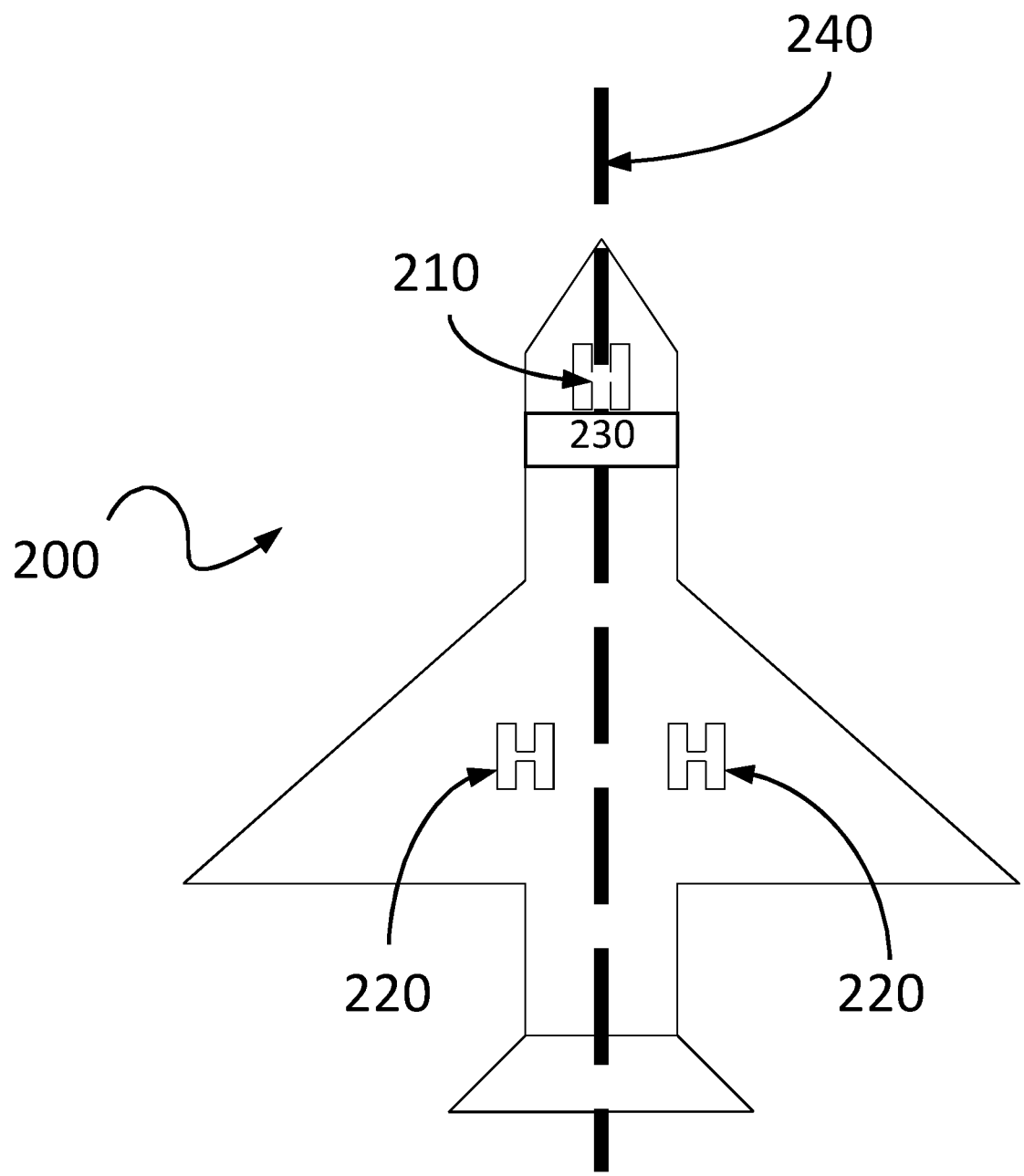
FIGS. 2a and 2b illustrate nosewheel alignment of an aircraft.
Figure 2B:
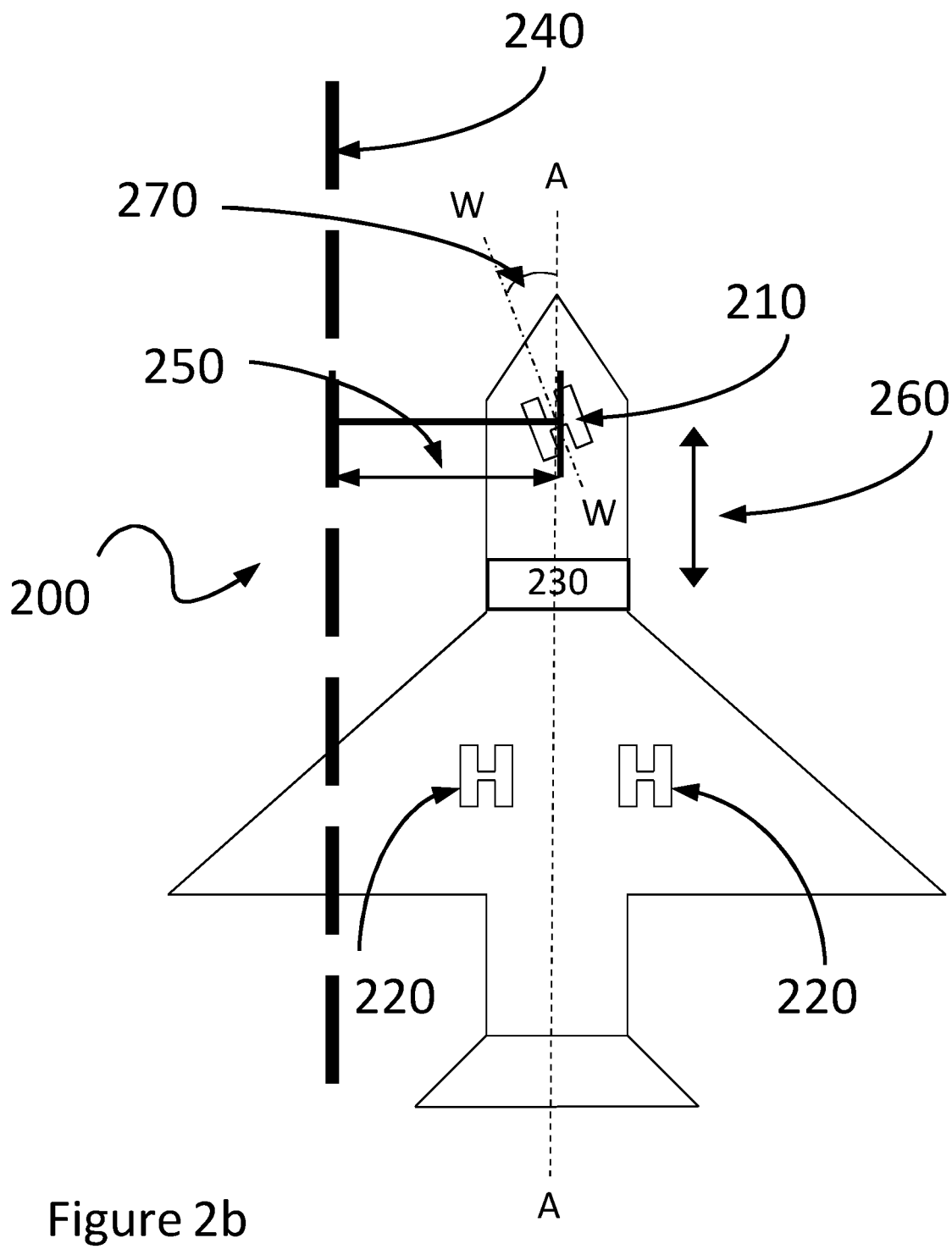

Determining the position is illustrated using FIGS. 2a and 2b. FIG. 2a illustrates a taxiing aircraft 200. Taxiing aircraft 200 comprises a nosewheel 210 and rear gear 220. The taxiing aircraft also comprises a GNSS receiver 230, configured to determine the location of the taxiing aircraft 200. Using the GNSS receiver 230 it may be determined that the nosewheel 210 has substantially no offset to the route line 240. The same taxiing aircraft 200 is illustrated in FIG. 2b. In FIG. 2b, using the GNSS receiver 230, it may be determined that the taxiing aircraft has an offset 250 to the route line 240.

Further, the position of the nosewheel 210 may be known with respect to the GNSS receiver 230 (e.g. in x, y, z, coordinates). For example, and as shown in FIG. 2b, the nosewheel is offset longitudinally (x-direction) from the GNSS receiver 230 by distance 260 along the centreline A-A of the aircraft, with both GNSS receiver 230 and nosewheel lying on the centreline A-A. In other examples, the GNSS receiver 230 may be alternatively or additionally offset laterally (y-direction) along the centreline A-A from the nosewheel. In other examples the GNSS receiver 230 may be alternatively or additionally offset in height (z-direction) relative to the nosewheel.

The processing means is configured to output an adjustment to the nosewheel angle to correct the deviation from the route based on the deviation of the nosewheel from the route line. The adjustment may be calculated by the processing means using a Proportional Integral Derivative (PID) controller. For example, the nosewheel angle 270 (i.e the angle subtended by the nosewheel roll axis W-W to the aircraft centreline A-A) may increase in proportion to the offset 250, albeit the angle 270 does not exceed a maximum operating angle which may take aircraft parameters (e.g. velocity or mass) into account.

The bandwidth of the PID controller may be variable, or there may comprise multiple PID controllers with fixed and different bandwidths. A low bandwidth PID controller may be used in straight segments. A low bandwidth controller allows for small adjustments to be made at a low frequency. A high bandwidth PID controller may be used during curved segments or in other situations. A high bandwidth PID controller allows for larger adjustments to be made at a high frequency. A high bandwidth PID controller also may ensure the smooth movement of the aircraft during turns, and may ensure that lateral G-forces are minimised.

The PID controller may also be tuned to avoid large nosewheel angles at high speeds while also allowing enough authority to maintain the route. The tuning may depend upon the particular limits of the aircraft and the airfield.

By sufficiently tuning the PID controller correct taxi manoeuvres can be allowed. For example, the PID may be tuned such that the nosewheel moves past the required turn, and the nose of the aircraft is swung around to regain with the route. This is similar to a large body vehicle such as a bus or a lorry. In such a manoeuvre the main gear maintains its position centralised on the route line.

Existing nosewheel steering control systems may be actuated in order to allow the Flight Management System (FMS) and autopilot system to control nosewheel direction.

A nosewheel steering system may also employ an active control sidestick (ACS) linked to the nosewheel steering system. The ACS based system could provide situational awareness to the pilot by back-driving the stick position to indicate the manoeuvre being performed, as already performed for autopilots in the air on existing aircraft.

The ACS based system may be configured to sense an input onto the active stick, such that the pilot would be able override the autopilot by applying a force to the active stick. In some examples there may comprise a threshold force to switch the autopilot from an active state to disarmed. In some examples any input below the threshold may be ignored. In some example any input below the threshold force may be used to adjust the nosewheel angle or throttle without deactivating the taxi autopilot.

The processing means also comprises means to send an adjustment to the speed of the aircraft. The adjustment of the speed is based on a current position on the route line and a proximity to the at least one determined route feature. The adjustment may comprise a speed limit imposed, which may be defined by the manufacturer of the aircraft or by the ATC.

In some examples the speed limit of the aircraft is obtained from a look-up table. In some examples the speed limit is based on at least one of a aircraft weight, weather conditions, proximity to static hazards, and proximity to moving hazards based on information provided by other systems.

The processor may comprise means to analyse a corner based on the defined route or route line. The analysis may be based on the degree of curvature of the corner, and takes into account the length of the corner and the angle of deviation from the start point to the end point of the corner. Using calculations based on these parameters a cornering profile can be determined.

A Supervised Regression Machine Learning system may be used and trained on a large dataset of aircraft taxi manoeuvres in order to profile speeds travelled along defined routes. Once trained the resultant predictor function would then be able to analyse any given route and produce a set of speed limits for each section of the route.

From the cornering profile, a speed can be determined such that the autothrottle system can adjust aircraft taxi speed to allow for optimal speed for the corner, where optimal may consider critical parameters such as lateral G-Forces, as well as factors such as reduced tyre wear or achieving best time to destination.

Cornering profiles may reside with the route data itself, where there exists a profile or absolute speed for each corner in the programmed route. Alternatively, the autopilot system may calculate corner profiles programmatically based on the programmed route profile, thus allowing adjustments to be made for weight of aircraft, desired time to end of route, etc.

As with steering, it is possible to use PID for speed adjustments, with the profiled speed being used as the setpoint for the controller. Further algorithms can then be used to apply appropriate levels of throttle or braking accordingly in order to reach and maintain the required speed.

Further algorithms may be required in order to handle transitions from straights to corners. For example: the target speed for a corner needs to be made the setpoint for the PID Controller well in advance of reaching the corner so that only light braking is needed to reach the cornering speed from the current straight-line speed. This logic is an area where optimization can take place, where speed of taxiing can be balanced against factors such as passenger comfort, aircraft tyre wear, or engine manufacturer's requirement to warm aircraft engines to an optimal temperature range prior to arrival at the take-off hold point.

Autobrake systems are prevalent in civil transport aircraft for both RTO (rejected take-off) and auto braking for landing. As well as autothrottle, it is envisaged that the autopilot would have control of the autobrake system of the aircraft, such that aircraft gear braking could be applied when appropriate. Primarily this would occur in the system on approach to the entry to a corner, where straight line speed must be reduced in order to reach the lower speeds inevitably required for cornering. Braking could also be used in emergency situations such as significant unplanned route deviation, or in specific disengagement situations such as reaching the end of a planned route.

The potential benefits of an auto-taxi system are improved safety, capability and efficiency. Auto-taxi may allow taxi navigation in severe weather conditions such as CATIII. Optimal speeds could be maintained while reducing brake wear. Safety could be improved by reducing the risk of incorrect taxi turns taken due to navigation errors at unfamiliar airports. Consistent auto-taxi speeds could allow ATC to adjust routing and scheduling based on more reliable times to destination, therefore leading to increased airport throughput. There is also great potential to improve crew/cockpit resource management (CRM) during the taxi phase, allowing crew to concentrate on checklists and charts due to reducing the airport navigation to a monitoring task.

Figure 3:
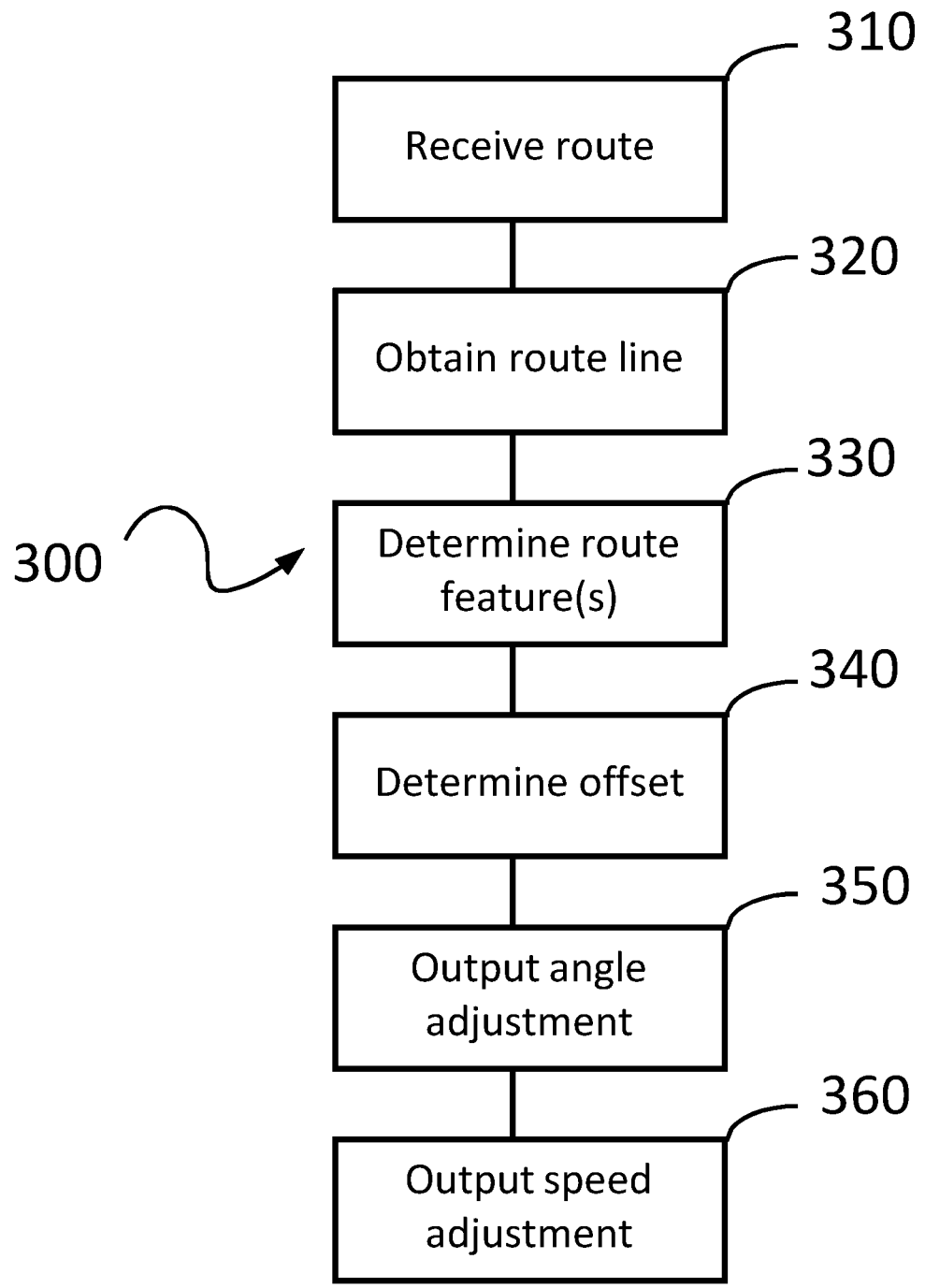
FIG. 3 illustrates a method in accordance with some examples.

A method 300 to autonomously taxi an aircraft is illustrated in FIG. 3. The method comprises receiving, by a processing means, a route intended for the aircraft 310. Obtaining, by the processing means, a route line based on the route 320. Determining, by the processing means, at least one route feature along the route line 330. Determining, by the processing means, a deviation of a nosewheel of the aircraft from the route line based on a current position of the aircraft provided by the aircraft global navigation satellite system (GNSS) 340. Outputting, by the processing means, an adjustment of an angle of the nosewheel to correct the deviation from the route based on the deviation of the nosewheel 350. Outputting, by the processing means, an adjustment of the speed of the aircraft based on a current position on the route line and a proximity to the at least one determined route feature 360.

It will be understood that processing components described above with reference to FIGS. 1-3 may in practice be implemented by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium; optical memory devices in general; etc. The examples described herein are to be understood as illustrative examples of embodiments of the invention. Any methods described are not limited to the order in which they are described, and the steps of the method may happen in any order. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, variations and modifications not described herein, as would be apparent to a person of ordinary skill in the relevant art, may also be employed within the scope of the invention, which is defined in the claims.

The invention claimed is:

1. A method to autonomously taxi an aircraft, the method comprising:
   receiving, by one or more processors, a route intended for the aircraft;
   obtaining, by the one or more processors, a route line based on the route;
   determining, by the one or more processors, at least one route feature along the route line;
   determining, by the one or more processors, a deviation of a nosewheel of the aircraft from the route line based on a current position of the aircraft provided by a Global Navigation Satellite System (GNSS) of the aircraft, and a nosewheel position determined by applying, based on an aircraft length, an offset to the current position of the aircraft, and determining whether the offset is calculated using standard spherical-surface formulae based on the aircraft length;
   causing, by the one or more processors, an adjustment of an angle of the nosewheel to correct for deviation from the route based on the deviation of the nosewheel; and
   causing, by the one or more processors, an adjustment of the speed of the aircraft based on a current position on the route line and a proximity to the at least one determined route feature.

2. The method according to claim 1, wherein the aircraft GNSS comprises a dual band system.

3. The method according to claim 1, wherein the at least one route feature comprises at least one of: a curve, a straight, a static hazard, or a dynamic hazard.

4. The method according to claim 1, wherein the offset is calculated using standard spherical-surface formulae if the aircraft length is above a threshold.

5. The method according to claim 1, wherein the one or more processors include at least one proportional integral derivative (PID) controller, and the angle of the nosewheel is adjusted by an amount determined using the at least one PID controller.

6. The method according to claim 5, wherein a low bandwidth PID controller is used for straight portions of the route line, and/or a high bandwidth PID controller is used for curved portions of the route line.

7. The method according to claim 5, wherein a bandwidth of the at least one PID controller is based on a radius of curvature of a current section of the route line.

8. The method according to claim 1, wherein a speed limit of the aircraft is obtained from a look-up table.

9. The method according to claim 8, wherein the speed limit is based on at least one of an aircraft weight, a weather condition, proximity to a static hazard, proximity to a moving hazard, or a local airfield standard procedure.

10. The method according to claim 1, wherein speed of the aircraft is reduced by causing, by the one or more processors, braking system adjustments.

11. The method according to claim 10, wherein speed of the aircraft is changed by causing, by the one or more processors, throttle adjustments.

12. The method according to claim 10, wherein speed of the aircraft is reduced in at least one of: prior to a turn, in an emergency situation, or at a determined end point.

13. The method according to claim 1, wherein the speed of the aircraft during a turn is adjusted based on a degree of curvature, length, and angle of deviation from a start point of the turn and an end point of the turn.

14. The method according to claim 1, wherein control of the aircraft switches to manual responsive to receiving an input on at least one of: a throttle, a flight surfaces control, or a tiller.

15. An aircraft comprising one or more processors configured to perform the method of claim 1.

16. One or more processors for autonomously taxiing an aircraft, the one or more processors configured to:
  receive a route intended for the aircraft;
  obtain a route line based on the route;
  determine at least one route feature along the route line;
  determine a deviation of a nosewheel of the aircraft from the route line based on a current position of the aircraft provided by a Global Navigation Satellite System (GNSS) of the aircraft, and a nosewheel position determined by applying, based on an aircraft length, an offset to the current position of the aircraft, and determine whether the offset is calculated using standard spherical-surface formulae based on the aircraft length;
  causing an adjustment of an angle of the nosewheel to correct for deviation from the route based on the deviation of the nosewheel; and
  causing an adjustment of the speed of the aircraft based on a current position on the route line and a proximity to the at least one determined route feature;
  wherein the one or more processors include one or more proportional integral derivative (PID) controllers configured to determine one or both of an amount to adjust the nosewheel angle and an amount to adjust the aircraft speed.

17. The one or more processors of claim 16, wherein the one or more PID controllers include:
  a variable bandwidth PID controller configured to provide one or more high bandwidth PID controller modes and one or more low bandwidth PID controller modes; or a first PID configured to provide the one or more low bandwidth PID controller modes, and a second PID controller configured to provide the one or more high bandwidth PID controller modes;
  the one or more low bandwidth PID controller modes used to determine the nosewheel angle adjustment amount and the aircraft speed adjustment amount for straight portions of the route line; and
  the one or more high bandwidth PID controller modes used to determine the nosewheel angle adjustment amount and the aircraft speed adjustment amount for curved portions of the route line.

* * * * *